Nov. 3, 1959

R. BIRMANN 2,911,138

TURBO-COMPRESSOR

Filed July 6, 1955

INVENTOR.
RUDOLPH BIRMANN
BY
ATTORNEYS

United States Patent Office 2,911,138
Patented Nov. 3, 1959

2,911,138
TURBO-COMPRESSOR

Rudolph Birmann, Newtown, Pa., assignor to De Laval Steam Turbine Company, Trenton, N.J., a corporation of New Jersey Application July 6, 1955, Serial No. 520,181

15 Claims. (Cl. 230—116)

This invention relates to turbo-compressors and has particular reference to the mounting of an overhung rotor carrying turbine and compressor blading.

In particular, in accordance with the invention there is provided an anti-friction bearing mounting for such a rotor having various desirable characteristics as follows:

The rotor is supported practically at its center of gravity, the rotor desirably having located within its body at least a part of a bearing which is mounted externally to a fixed (though slightly deflectable) shaft.

For any allowable shaft deflection, all linear speeds of the anti-friction bearing (pitch line speeds, race speeds, etc.) are the minimum and can be held within conventional satisfactory limits in spite of unconventionally high rotational speeds of the rotor. In typical arrangements, for example, the rotor may operate at speeds of the order of 60,000 to 110,000 r.p.m.

The mounting of the rotor is at a point where its temperature is the minimum, approximating ambient atmospheric temperature and the mounting is such that heat flow from the hot portions of the rotor to the bearing by radiation and convection is minimized.

Heat flow to the bearing from the hot rotor portions is further minimized and the heat generated by the bearings themselves is carried away by forced flow of cooling air.

Further in accordance with the invention, there is provided an elastic bearing mounting designed to eliminate the deleterious effect of critical speeds, for which purpose it combines, in proper proportions, radial elasticity and damping. Furthermore, it permits full control of radial displacement both with regard to magnitude and with regard to continued parallelism of the rotor axis. This latter is a particularly important feature which has not previously been accomplished with overhung rotors. In the past, elastic deflection of the bearing mountings of such rotors was associated with tilting of the rotor axis, giving rise to gyroscopic disturbances.

The main objects of the present invention relate to the attainment of the several features above indicated. These and other objects of the invention relating particularly to details of construction and operation will become apparent from the following description read in conjunction with the accompanying drawings, in which.

Figure 1:
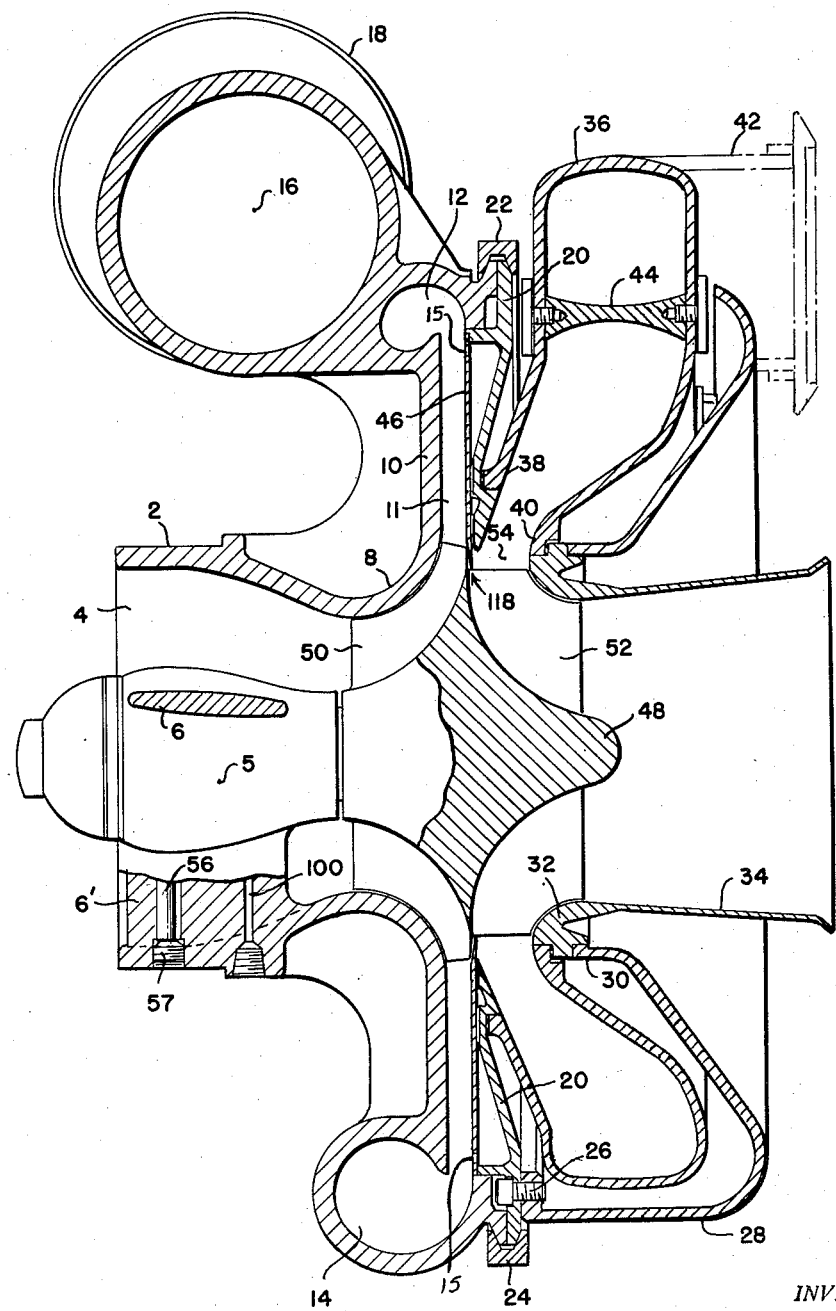
Figure 1 is an axial section taken through a turbo-compressor provided in accordance with the invention.

The turbo compressor particularly illustrated and described herein is designed for supercharging use in association with an internal combustion engine which may be either of diesel or spark ignition type. The turbine of the turbo-compressor is driven by the engine exhaust gases and the compressor provides air for supercharging and, in the case of two-cycle engines, for scavenging.

The compressor portion of the housing is generally indicated at 2 and is provided with an air intake opening 4 in the central portion of which there is located the housing 5 for the mounting of the shaft arrangement, this latter housing being supported by streamlined struts 6 and 6' between which the air flow takes place.

The housing 2 is formed (at 8) to provide an outer wall for the compressor passages and at 10 is provided with a substantially radial wall forming one boundary of a vaneless diffuser passage 11 which discharges into the compressor scroll surrounding the rotor axis and of increased cross-section for the air flow as indicated at 12, 14 and 16, the air being discharged through the outlet indicated at 18.

A disc-like diaphragm member 20 is secured to the compressor housing by two semi-circular clamping rings 22 and 24 arranged to be drawn radially toward each other to effect wedge type clamping by means of bolts (not shown). Secured by bolts 26 to the diaphragm member 20 is a relatively rigid strong back 28 which, as will appear hereafter, remains relatively cold in comparison with the walls which are in direct contact with the hot driving gases. An internal flange 30 of the strong back 28 serves to receive and mount the flange portion 32 of an exhaust gas diffuser 34 which flares outwardly to discharge the exhaust gases from the turbine to the atmosphere. The flange portion 32 serves in part as the stationary turbine blade shroud, defining the outermost portions of the gas passages.

A gas chest 36 of annular form (which except for the enlarged flange portions is made of relatively thin flexible metal) is provided with flanges 38 and 40 engaging the diaphragm member 20 and the flange portion 32, respectively, of the exhaust diffuser 34. Packing rings are provided at these engaging regions and tightness is maintained by the outward expansion of the thin walls of the gas chest under the pressure therein to maintain tight contacts on the packing rings between flange 38 and disc member 20 on the one hand and between flanges 40 and 32 on the other.

Gases are introduced into the gas chest 36 through the inlet members 42, only one of which is indicated, and there are disposed within the gas chest pivoted directing vanes 44 serving to direct the inflow gases to produce circumferential flow within the gas chest. The gas chest is so arranged that the inflow gases directed by the vanes 44 are caused to spiral inwardly with sufficient radial dimensions of the gas chest to provide the attainment by the inflow gases of free vortex flow so that they approach the turbine blading in a generally tangential direction with an inward component of flow suitable for turbine drive without the provision of turbine nozzles. This matter is further described and claimed in my application Serial Number 360,500, filed June 9, 1953.

Radial diaphragm 46 secured to the ring member 20 serves to provide a boundary supplementing that illustrated at 10 for the diffuser passage 11.

The rotor 48 carries compressor blades 50 on one axial side and turbine blades 52 at its other axial side. So far as the present invention is concerned, these compressor and turbine blades may be of various known types but desirably are of the types particularly described in my application Serial No. 428,627, filed May 10, 1954, providing for vortex flow of the air undergoing compression and of the driving gases. Air enters the blading 50 from the inlet passage 4 and is discharged into the vaneless diffuser 11. The driving gases having vortex flow in the region 54 enter the turbine blading 52 and discharge therefrom through the exhaust diffuser 34.

Figure 2:
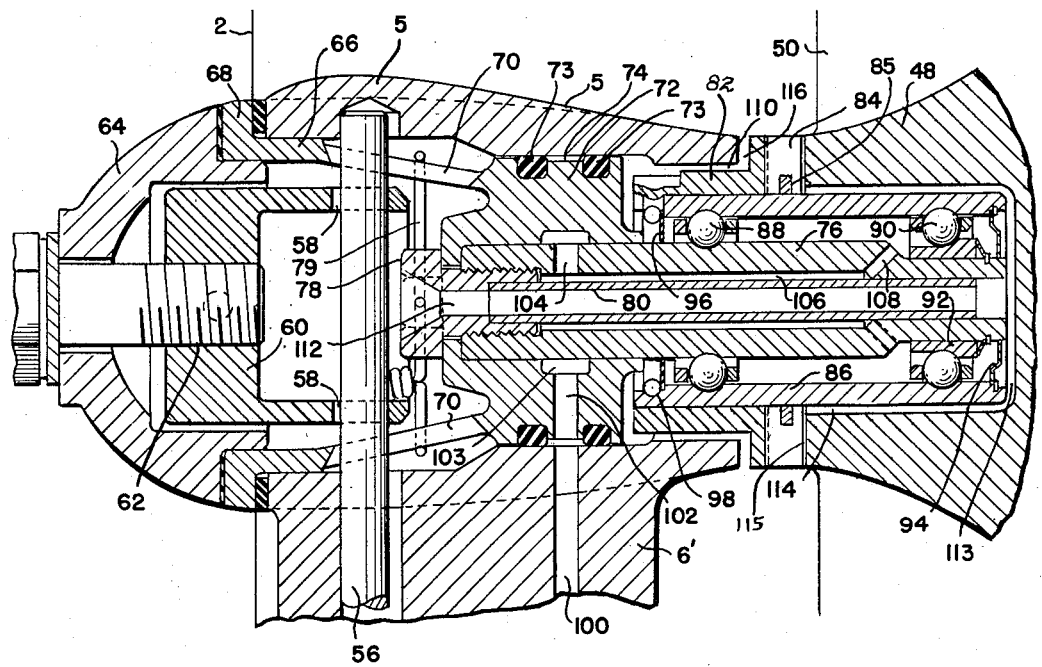
Figure 2 is an enlarged sectional view showing bearing details.

Referring particularly to Figure 2, a pin 56, which is held by screw 57 in a radial opening through strut 6', passes through aligned openings 58 in member 60 which is threaded at 62 to receive a bolt holding in position a clamping cap 64 which with the interposition of gaskets serves to clamp to the housing 5 the flange 68 of shaft support 66 provided with a plurality of integral arms 70 which, in turn, are integral with body portion 72 provided with annular grooves which receive O-rings 73 of rubber which are compressed against an inner bore of the housing 5, there being metal-to-metal clearance between the body portion 72 and the walls of this bore. As will hereafter appear, the body portion 72 of member 66 has some freedom of radial movement controlled by the stiffness of the arms 70 and by the damping action of the O-rings 73.

The body portion 72 of member 66 has fixed in a bore therein a shaft 76 which remains stationary from the stand-point of rotational movement, this shaft being secured by a bolt 78 threaded into the shaft and clamping between its head and one end of the shaft an inwardly directed flange on the body portion 72.

The bolt 78 has its head locked after assembly by a wire 79 and supports a tube 80 in alignment with an opening 112 in the bolt to provide passageways as will hereafter appear.

Secured to the rotor body 48 by interlocking radial splines 84 is a cylindrical member 82 serving to mount the rotor on the outer race 86 of a ball bearing assembly comprising the two sets of balls 88 and 90, the former running in an annular groove in the shaft 76 and the latter in an inner race 92 which receives the reduced diameter end of the shaft 76. Rings 94 and 96 serve to effect substantial sealing of the ball bearing assembly, the ring 96 being held in position by a snap ring 98 received in a groove in the outer race 86.

For the purpose of lubricating the bearing arrangement, and oil mist is introduced through the opening 100 in the strut 6' and passes therefrom into the groove 74 surrounding the body portion 72 of member 66 between the O-rings 73. From this groove it is directed by a bore 102 into an annular channel 103 from which it is, in turn, directed through a radial passage 104 into the annular space 106 between the shaft 76 and a tube 80, which space communicates, in turn, through openings 108, with the space containing the balls of the bearing. The annular space 106 is confined by reason of the fact that the rotor end of the tube 80 has tight engagement with the bore of the shaft 76 adjacent to the balls 90. The oil mist thus forced in provides lubrication for the balls in their raceways, the air with contained oil bleeding continuously in small amounts past the rings 94 and 96.

For the cooling of the bearing assembly, air entering the left-hand portion of the bearing housing 5 is piped from the compressor discharge scroll. The cooling air enters the bore 112 of bolt 78 and passes therefrom through the interior of tube 80 to the space 113 within the rotor 48 surrounding the right-hand end of the bearing assembly. From this, flow takes place through one or more channels 114 in the interior of sleeve member 82 to the left-hand end of the rotor 48 and flows through radial passages 115 formed by the interlocking splines 84 to the exterior surface of the rotor 48. This air flow, as will be evident, serves to cool the interior of the portion of the rotor which surrounds the bearing assembly and serves for cooling isolation of the assembly to a substantial extent from the rotor.

The members 82 and 48 have interlocking radial splines 84 held together by a split snap ring 85, to provide flexibility and allow for expansion.

Additional rotor cooling provision occurs by reason of the spacing at 118 of the diaphragm 46 from the rotor to provide bleeding of air from the compressor passages over the periphery of the rotor body into the inner portions of the turbine passages, the air flowing adjacent to the hub surface and mingling with the driving gases. Finally, compressed air is admitted through holes 15 provided near the outside diameter of the partition assembly. This air flows through the hollow space formed by the two members 20 and 46 of the partition assembly, and is directed by tangential slots into the turbine blades. Substantial cooling of the hub surface is thus provided, tending further to maintain its temperature relatively low.

Reference may now be made particularly to the mounting arrangement of the shaft 76. The arms 70 previously mentioned provide, in effect, leaf springs which converge toward the center of gravity of the rotor which, in the arrangement illustrated, is located approximately at the right-hand end of the shaft 76. A tendency of the rotor to shift transversely of its axis of rotation will produce flexure of springs 70 and, in particular, compression of the spring or springs located on the side toward which motion is directed and tension of the diametrically opposed spring or springs. This, in itself, would tend to cause tilting of the shaft 76 but, due to the fact that the springs 70 converge toward the center of gravity of the rotor, it will be evident, considering the anchorages of the springs at their ends, that the spring or springs subjected to compression can only move so that the end or ends thereof nearest the rotor will swing slightly outwardly while the corresponding ends of the springs in tension will swing slightly inwardly. The result is a compensated action which serves to maintain the center line of the shaft 76, when moved, substantially parallel to the center line of the shaft in its unmoved position and, consequently, the axis of the rotor against angular tilting thereby avoiding gyroscopic disturbances.

Figure 3:
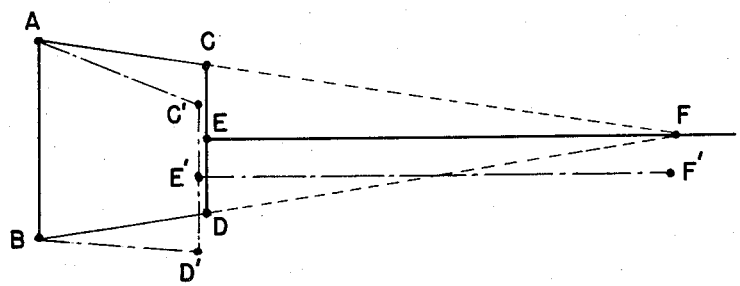
Figure 3 is a diagram indicating, in particular, how deflections are permitted while, nevertheless, tilting of the rotor axis is substantially avoided.

What has just been indicated may be made clearer by reference to Figure 3 which is a diagram showing in exaggerated fashion what tends to occur. Neglecting for the sake of presentation the spring action of the arms 70, assume that these arms are replaced by links AC and BD, points A and B corresponding to the points of anchorage of the arms at their outer ends, and C and D corresponding to the points of anchorage to the body portion 72 which rigidly carries the shaft, the body portion being represented by the link CD and the shaft at EF. F may be assumed to be the location of the center of gravity.

If, now, in this linkage it was assumed that the shaft EF was moved downwardly, the point C would move downwardly and toward the left and the point D would move downwardly and toward the right, resulting in the absence of compression on the links AC and BD in tilting of the shaft EF upwardly toward the right. However, due to elongation of the link AC under stress and due to compression of the link BD under stress, the movements of the points C and D would be first to C' and D' with the line C'D' remaining parallel to CD and with consequent movement of the shaft EF parallel to itself to the position E'F'. The simplified assumptions just made indicate descriptively how the shaft 76 maintains parallelism to itself in the actual structure illustrated. The arms 70 acting as springs, of course, flex rather than pivot, but the movements are somewhat similar to what has just been described and in view of expansion and compression under stress the parallel condition of the shaft 76 is maintained. The stiffness of the springs, of course, offers resistance to lateral motion of the rotor and any lateral motions which are, in any event, slight, are damped by the action of the O-rings 73. The result is that radial displacements of the rotor particularly tending to occur at critical speeds are damped and, in particular, are not attended by tilting of the rotor axis which in the case of overhung rotors was, in the past, associated with gyroscopic disturbances which could produce damaging stresses.

It may be pointed out that in the actual design due account is also to be taken of bending of the shaft 76 so that some overcorrection is desirably made to insure as far as possible the maintenance of substantial parallelism of the axis of rotation of the rotor.

It will be noted from the foregoing description that the arrangement is such that the rotary parts of the ball bearings are at minimum radius. Thus, the speeds involved at the races and at the pitch line are relatively low despite very high angular rotational speeds of the rotor.

What is claimed is:

1. An elastic fluid handling device comprising a rotor having a hub carrying blading, and mounting means for said rotor, said mounting means comprising a substantially stationary shaft, a bearing at least partially located within said hub and supporting the hub on said shaft, and means mounting said shaft and constraining it to move only substantially parallel to itself under stresses imparted to the shaft by said rotor, said shaft mounting means comprising a member having a first fixed portion and a second portion rigidly mounting said shaft with leaf spring members joining said portions.

2. An elastic fluid handling device comprising a rotor having a hub carrying blading, and mounting means for said rotor, said mounting means comprising a substantially stationary shaft, a bearing at least partially located within said hub and supporting the hub on said shaft, and means mounting said shaft and constraining it to move only substantially parallel to itself under stresses imparted to the shaft by said rotor, said shaft mounting means comprising a member having a first fixed portion and a second portion rigidly mounting said shaft with leaf spring members joining said portions, said leaf spring members converging towards the center of gravity of said rotor.

3. An elastic fluid handling device comprising a rotor having a hub carrying blading, and mounting means for said rotor, said mounting means comprising a substantially stationary shaft, a bearing at least partially located within said hub and supporting the hub on said shaft, means mounting said shaft and constraining it to move only substantially parallel to itself under stresses imparted to the shaft by said rotor, said shaft mounting means comprising a member having a first fixed portion and a second portion rigidly mounting said shaft with leaf spring members joining said portions, and means damping movements of said shaft.

4. An elastic fluid handling device comprising a rotor having a hub carrying blading, and mounting means for said rotor, said mounting means comprising a substantially stationary shaft, a bearing at least partially located within said hub and supporting the hub on said shaft, means mounting said shaft and constraining it to move only substantially parallel to itself under stresses imparted to the shaft by said rotor, said shaft mounting means comprising a member having a first fixed portion and a second portion rigidly mounting said shaft with leaf spring members joining said portions, said leaf spring members converging towards the center of gravity of said rotor, and means damping movements of said shaft.

5. An elastic fluid handling device comprising a rotor having a hub carrying blading, and mounting means for said rotor, said mounting means comprising a substantially stationary shaft, a bearing at least partially located within said hub and supporting the hub on said shaft, means mounting said shaft and constraining it to move only substantially parallel to itself under stresses imparted to the shaft by said rotor, and means damping movements of said shaft, said damping means comprising elastic O-rings.

6. An elastic fluid handling device comprising a rotor having a hub carrying blading, and mounting means for said rotor, said mounting means comprising a substantially stationary shaft, a bearing at least partially located within said hub and supporting the hub on said shaft, means mounting said shaft and constraining it to move only substantially parallel to itself under stresses imparted to the shaft by said rotor, said shaft mounting means comprising a member having a first fixed portion and a second portion rigidly mounting said shaft with leaf spring members joining said portions, and means damping movements of said shaft, said damping means comprising elastic O-rings.

7. An elastic fluid handling device comprising a rotor having a hub carrying blading, and mounting means for said rotor, said mounting means comprising a substantially stationary shaft, a bearing at least partially located within said hub and supporting the hub on said shaft, means mounting said shaft and constraining it to move only substantially parallel to itself under stresses imparted to the shaft by said rotor, said shaft mounting means comprising a member having a first fixed portion and a second portion rigidly mounting said shaft with leaf spring members joining said portions, said leaf spring members converging towards the center of gravity of said rotor, and means damping movements of said shaft, said damping means comprising elastic O-rings.

8. A turbo-compressor comprising a rotor having a hub carrying compressor blading at one axial side thereof and turbine blading at the other axial side thereof, and mounting means for said rotor, said mounting means comprising a housing, a substantially stationary shaft mounted in said housing, a bearing assembly at least partially located within said hub at the side thereof carrying the compressor blading and supporting the hub on said shaft, and means within said housing and said shaft for directing a flow of cooling air about said bearing assembly externally thereof.

9. A turbo-compressor comprising a rotor having a hub carrying compressor blading at one axial side thereof and turbine blading at the other axial side thereof, and mounting means for said rotor, said mounting means comprising a housing, a substantially stationary shaft mounted in said housing, a bearing assembly at least partially located within said hub at the side thereof carrying the compressor blading and supporting the hub on said shaft, means within said housing and said shaft for directing a flow of cooling air about said bearing assembly externally thereof, and means within said housing and said shaft for directing a lubricating oil spray to said bearing assembly internally thereof.

10. A turbo-compressor comprising a rotor having a hub carrying compressor blading at one axial side thereof and turbine blading at the other axial side thereof, means providing an overhung mounting for said rotor, a housing supporting said rotor mounting, a housing for said compressor blading connected to said first mentioned housing, a housing for said turbine blading, diaphragm means separating said blading housings, said diaphragm means providing for bleeding of air from the compressor compressed by said compressor blading over the periphery of said hub into the passages bounded by said turbine blading.

11. A turbo-compressor comprising a rotor having a hub carrying compressor blading at one axial side thereof and turbine blading at the other axial side thereof, means providing an overhung mounting for said rotor, a housing supporting said rotor mounting, a housing for said compressor blading connected to said first mentioned housing, a housing for said turbine blading, diaphragm means separating said blading housings, said diaphragm means providing for bleeding of air compressed by said compressor blading over the periphery of said hub into the passages bounded by said turbine blading, the last mentioned housing providing a substantially rigid structure, and a member providing an annular gas chest of thin flexible metal located at least partially within said last mentioned housing.

12. A turbo-compressor comprising a rotor having a hub carrying compressor blading at one axial side thereof and turbine blading at the other axial side thereof, means providing an overhung mounting for said rotor, a housing supporting said rotor mounting, a housing for said compressor blading connected to said first mentioned housing, a housing for said turbine blading, diaphragm means separating said blading housings, said diaphragm means providing for bleeding of air compressed by said compressor blading over the periphery of said hub into the passages bounded by said turbine blading, the last mentioned housing providing a substantially rigid structure, and a member providing an annular gas chest of thin flexible metal located at least partially within said last mentioned housing, said member having bounding edges arranged to be tightly associated with the last mentioned housing by flexure under the pressure of gas in said member.

13. An elastic fluid handling device comprising a rotor having a hub carrying blading, and mounting means for said rotor, said mounting means comprising a substantially stationary shaft, a bearing at least partially located within said hub and supporting the hub on said shaft, means mounting said shaft and constraining it to move only substantially parallel to itself under stresses imparted to the shaft by said rotor, and means damping movements of said shaft.

14. An elastic fluid handling device comprising a rotor having a hub carrying blading, and mounting means for rotatably mounting said rotor, said mounting means comprising a substantially stationary shaft, a bearing at least partially located within said hub and supporting the hub on said shaft, and resilient means for mounting said shaft and constraining it to limited sidewise bodily shifting movements under stresses imparted to the shaft by said rotor.

15. An elastic fluid handling device comprising a rotor having a hub carrying blading, and mounting means for rotatably mounting said rotor, said mounting means comprising a substantially stationary shaft, a bearing at least partially located within said hub and supporting the hub on said shaft, resilient means for mounting said shaft and constraining it to limited lateral bodily shifting movements under stresses imparted to the shaft by said rotor, and means damping movements of said shaft.

References Cited in the file of this patent

UNITED STATES PATENTS

| | | |
|---|---|---|
| 2,184,197 | Schutte | Dec. 19, 1939 |
| 2,447,292 | Van Acker | Aug. 17, 1948 |
| 2,480,095 | Buchi | Aug. 23, 1949 |
| 2,577,179 | Buchi | Dec. 4, 1951 |
| 2,648,492 | Stalker | Aug. 11, 1953 |